(12) United States Patent
Yamazaki

(10) Patent No.: US 7,306,380 B2
(45) Date of Patent: Dec. 11, 2007

(54) OPTICAL CONNECTOR

(75) Inventor: Tomohiro Yamazaki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/430,787

(22) Filed: May 8, 2006

(65) Prior Publication Data
US 2006/0263012 A1   Nov. 23, 2006

(30) Foreign Application Priority Data
May 23, 2005   (JP)   ............................. 2005-149998

(51) Int. Cl.
*G02F 1/035*   (2006.01)
*G02F 1/295*   (2006.01)
*G02B 6/26*   (2006.01)
*G02B 6/42*   (2006.01)
*G02B 6/36*   (2006.01)
*G02B 6/44*   (2006.01)

(52) U.S. Cl. .................. 385/88; 385/2; 385/8; 385/53; 385/89; 385/92; 385/101

(58) Field of Classification Search ............ 385/2, 385/8, 53, 88, 89, 92, 101
See application file for complete search history.

(56) References Cited

U.S. PATENT DOCUMENTS

| | | | |
|---|---|---|---|
| 2002/0006748 A1* | 1/2002 | Tolmie et al. | 439/608 |
| 2002/0064349 A1* | 5/2002 | Ngo et al. | 385/53 |
| 2002/0181895 A1* | 12/2002 | Gilliland et al. | 385/88 |
| 2003/0185502 A1* | 10/2003 | Kawashima et al. | 385/24 |

FOREIGN PATENT DOCUMENTS

| | | |
|---|---|---|
| JP | 11-136869 | 5/1999 |
| JP | 11-187143 | 7/1999 |
| JP | 2004-336512 | 11/2004 |

* cited by examiner

*Primary Examiner*—Frank G. Font
*Assistant Examiner*—Jerry Martin Blevins
(74) *Attorney, Agent, or Firm*—Hogan & Hartson LLP

(57) ABSTRACT

This invention solves this problem by including an optical transmitter module and optical receiver module inside the connector so as to carry out spatial optical transmitting of optical signal obtained by conversion with the optical transmitter module for optical transmitting between the optical transmitter module and the optical receiver module opposing each other across space.

11 Claims, 11 Drawing Sheets

OPTICAL CONNECTOR

BACKGROUND OF THE INVENTION

1. Field of the Invention

The present invention relates to an optical connector, more particularly to an optical connector having an optical transmitter module and an optical receiver module for transmitting information by spatial optical transmitting inside the connector. The disclosures of Japanese Patent Application No. 2005-149998 filed May, 23, 2005 including specification, drawings and claims are incorporated herein by reference in its entirety.

2. Description of the Related Art

An electronic apparatus such as personal computer executes data communication with peripheral devices, for example, a mouse, a printer, a keyboard connected outside of the main body in order to intensify its function and a variety of means for executing data communication with the personal computer connected to such peripheral devices are provided (see, for example, Japanese Patent Application Laid-Open No.11-187143 and Japanese Patent Application Laid-Open No.11-136869).

Further, in recent years, universal serial bus (USB) has been widely used to intensify expandability between an electronic apparatus such as personal computer and the peripheral devices. This USB is serial interface standard which can be used commonly for communication based on USB standard between the personal computer and the peripheral devices such as a printer, and a mouse. Because using the USB standard enables the peripheral devices such as the printer to be connected or disconnected easily with the personal computer powered on, availability of data communication between the peripheral device and the personal computer is improved considerably.

A USB cable is used for connecting an apparatus main body to the peripheral devices electrically to exchange signals between an electronic apparatus such as the personal computer and the peripheral devices and a USB connector is used as a connector for connecting this USB cable to the apparatus main body or the peripheral devices (see for example, Japanese Patent Application Laid-Open No.2004-336512).

SUMMARY OF THE INVENTION

The USB connector is connected physically to a conductive terminal to execute communication of data and power feeding using electricity as medium. In such physical connection, the USB is connected/disconnected frequently or often used violently by a user so that there occurs such a problem that communication fails due to damage of the wiring and therefore, this problem has been demanded to be solved.

Therefore, an object of the present invention is to provide a reliable optical connector capable of preventing connection failure due to damage of wiring and having a high durability to connecting/disconnecting action in order to solve the above-described problem.

The present invention achieves the above-described object by disposing an optical transmitter module and optical receiver module inside a connector and executing spatial optical transmitting of optical signal obtained by conversion by the optical transmitter module for optical transmitting between the optical transmitter module and the optical receiver module opposing each other across space.

More specifically, according to a first aspect of the present invention, there is provided an optical connector for connecting electronic apparatuses or an electronic apparatus with a peripheral device and having a first connector and second connector for transmitting information between such apparatuses or devices, wherein the first connector includes at least an optical transmitter module that converts electric signal input to interior of a case to optical signal and transmits to the second connector; the second connector includes at least an optical receiver module that are opposed the optical transmitter module of the first connector inside the case, converts optical signal from the optical transmitter module of the first connector and outputs; and the first connector and the second connector are connectable/disconnectable.

The invention of this aspect can provide an optical connector in which no connection failure due to damage of wiring occurs and having semi-permanent durability against frequent connecting/disconnecting actions because the optical transmitter module and optical receiver module are disposed inside the case without using any physical connection such that they are opposed to each other so as to transmit information by spatial optical transmitting.

Further, high-speed transmitting and high-capacity transmitting can be achieved by adopting optical transmitting as a transmitting means for data information. Further, because such optical transmitting is carried out inside the case, cross talk can be suppressed and the eye safety can be secured, thereby ensuring reliability and safety.

In the meantime, as the electronic apparatus to be connected, for example, personal computer (including a case where it is connected to a cradle) and digital apparatuses can be mentioned and as the peripheral device, for example, a mouse, a printer, a keyboard, a digital still camera, a digital video camera, an USB memory and the like can be mentioned.

According to a second aspect of the invention, there is provided the optical connector according to the first aspect wherein the first connector includes plural optical transmitter modules and the second connector includes plural optical receiver modules corresponding to the optical transmitter modules.

Because the present invention employs a plurality of the optical transmitter modules to be disposed in the first connector and a plurality of the optical receiver modules to be disposed in the second connector, plural optical transmitting can be executed in a single direction thereby achieving high-speed transmitting of information.

According to a third aspect of the present invention, there is provided an optical connector for connecting electronic apparatuses or an electronic apparatus with a peripheral device and having a first connector and second connector for transmitting information between such apparatuses or devices, wherein the first connector includes at least an optical transmitter module that converts electric signal input to interior of the case to optical signal and sends to the second connector and at least an optical receiver module that receives optical signal from the second connector, converts to electric signal and outputs; the second connector includes at least an optical receiver module that is opposed to the optical transmitter module of the first connector inside the case, converts optical signal from the optical transmitter module of the first connector to electric signal and outputs and an optical transmitter module that is opposed to the optical receiver module of the first connector, converts the input electric signal to optical signal and sends to the optical receiver module of the first connector; and the first connector and the second connector are connectable/disconnectable.

Consequently, the present invention enables bi-directional optical transmitting to be executed so as to achieve diversification of information transmitting because the optical transmitter module and optical receiver module are disposed in the first connector and second connector.

According to a fourth aspect of the present invention, there is provided the optical connector according to the second or third aspect, wherein light shielding bodies are disposed inside the first connector and the second connector so that passages of optical signals transmitted by the optical transmitter modules of the first connector or the second connector are separated by the light shielding bodies.

As a consequence, the present invention can execute stable spatial optical transmitting without any interference of optical signals because the passages of optical signals are separated by the light shielding bodies.

According to a fifth aspect of the present invention, there is provided the optical connector according to the second or third aspect, wherein the wavelengths of optical signals transmitted by the optical transmitter modules of the first connector and the second connector are different from each other and the optical receiver module corresponding to the optical transmitter module includes a wavelength selecting filter that allows only the wavelength of optical signal transmitted by the corresponding optical transmitter module to pass through.

Because the wavelengths of optical signals emitted from the optical transmitter modules are set different from each other and the optical receiver module includes a wavelength selecting filter which allows only the wavelength of optical signal emitted from a corresponding optical transmitter module to pass through, the present invention enables the optical receiver module to receive optical signal from the corresponding optical transmitter module securely, thereby achieving stable spatial optical transmitting.

According to a sixth aspect of the present invention, there is provided the optical connector according to the second or third aspect, wherein the wavelengths of optical signals transmitted by the optical transmitter modules of the first connector and the second connector are different from each other and the light receiving element (element?) disposed in the optical receiver module corresponding to the optical transmitter module receives only the wavelength of optical signal transmitted from the corresponding optical transmitter module selectively.

Because the wavelengths of the optical signals emitted from the optical transmitter modules are set different from each other and the light receiving element disposed in the optical receiver module receives only the wavelength of optical signal emitted from a corresponding optical transmitter module selectively, the present invention enables the optical receiver module to receive optical signal from a corresponding optical transmitter module securely like mentioned in the fifth aspect, thereby achieving stable spatial optical transmitting.

According to a seventh aspect of the present invention, there is provided an optical connector for connecting electronic apparatuses or an electronic apparatus with a peripheral device and having a first connector and a second connector for transmitting information between the electronic apparatuses or the electronic apparatus and the peripheral devices, wherein the first connector includes an optical transmitter/receiver module having at least a light transmitting portion that converts electric signal input to interior of a case to optical signal and sends to the second connector, at least a light receiving portion that receives optical signal having a wavelength different from the optical signal of the light transmitting portion from the second connector, converts to electric signal and outputs, and a wavelength selecting filter that directs optical signal from the second connector to the light receiving portion and directs optical signal from the light transmitting portion to the second connector; the second connector includes an optical transmitter/receiver module having at least a light receiving portion that is opposed to the optical transmitter/receiver module of the first connector inside the case and converts optical signal from the light transmitting portion of the first connector to electric signal and outputs, a light transmitting portion that converts the input electric signal to optical signal and sends to the light receiving portion of the first connector, and a wavelength selecting filter that directs optical signal from the light transmitting portion of the first connector to the light receiving portion of the second connector and directs optical signal from the light transmitting portion of the second connector to the light receiving portion of the first connector; and the first connector and the second connector are connectable/disconnectable.

As a consequence, the present invention can execute bi-directional optical transmitting so as to achieve diversification of information transmitting because the optical transmitter/receiver modules are disposed in the first connector and the second connector to execute the optical transmitting. Further, adopting the optical transmitter/receiver module enables the quantity of necessary components and necessary space to be reduced as compared with the optical connector of the third aspect, thereby achieving reduction in the size of the optical connector preferably.

According to an eighth aspect of the present invention, there is provided the optical connector according to any one of the first to seventh aspect, wherein the cases are formed of conductive material and the cases are connected electrically through contact between the first connector and the second connector thereby enabling supply of electric signal or direct current through the cases.

Because the cases formed of conductive material make physical contact with each other when the first connector and the second connector are connected, the present invention can execute power feeding (supply of direct current) of supplying current between the both connectors and supply of electric signals (data communication).

According to a ninth aspect of the present invention, there is provided the optical connector according to any one of the first to eighth aspect further including an optical transmitter module for power feeding that supplies electricity to interior of the case of the first connector in the form of light and an optical receiver module for power receiving that is supplied with electricity to interior of the case of the second connector.

Because the optical connector according to the present invention includes the optical transmitter module for power feeding which supplies electricity in the form of light and the optical receiver module for power receiving of being supplied with electricity in the form of light, the optical connector capable of transmitting electricity as well as information optionally can be provided.

EFFECT OF THE INVENTION

The optical connector of the present invention executes transmitting of data information through optical transmitting with the optical transmitter module and optical receiver module without any contact between them inside the case by disposing the optical transmitter module and the optical receiver module inside a case to be opposed to each other without using the conventional structure for data information transmitting with conductive terminals connected physical contact. As a consequence, an optical connector capable of preventing connection failure due to damage of wiring and having semi-permanent durability against connecting/disconnecting actions can be provided. Further, because optical transmitting is adopted as a transmitting means of data information, high-speed transmitting and high-capacity transmitting can be achieved. Further, leakage of light can be suppressed to achieve the eye safety by executing optical transmitting inside the case thereby providing an optical connector excellent in reliability and safety.

DESCRIPTION OF THE PREFERRED EMBODIMENTS

Hereinafter, an embodiment of the present invention will be described with reference to the accompanying drawings.

Figure 1A:
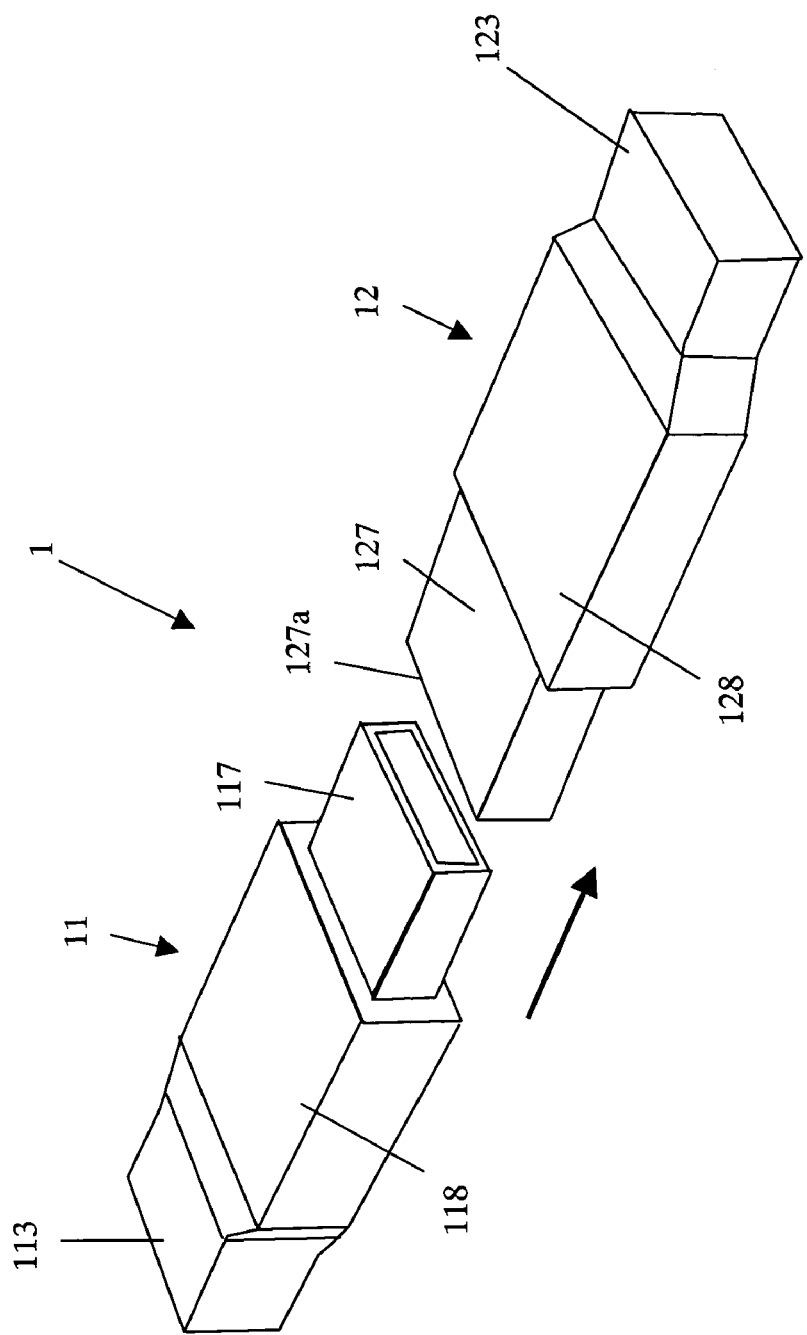
FIGS. 1A and 1B are schematic diagrams showing a connector according to a first embodiment of the present invention.
Figure 1B:
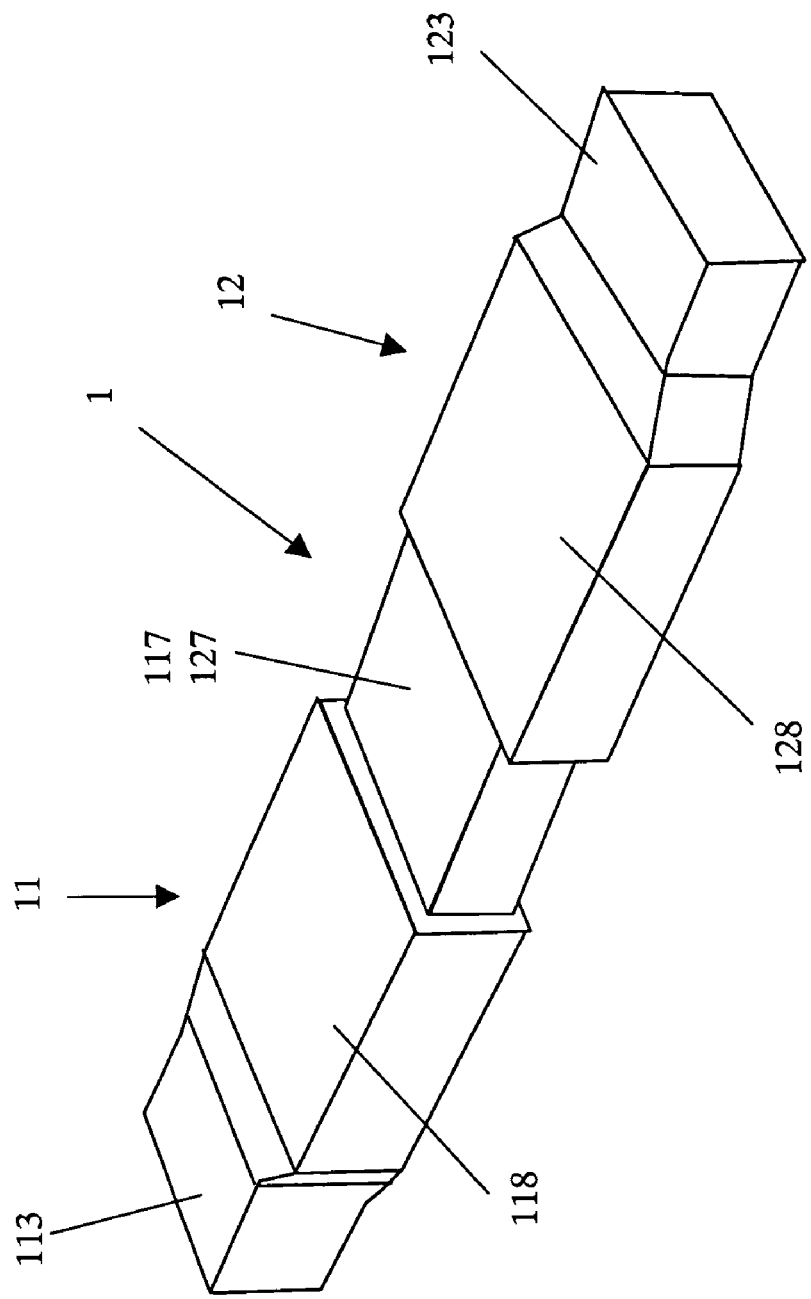

(I) First Embodiment (A) Optical Connector 1:

FIGS. 1A and 1B are diagrams showing an embodiment of the optical connector of the present invention, FIG. 1A is a schematic view showing a condition in which a first connector and a second connector are disconnected and FIG. 1B is a schematic view showing a condition in which the first connector and the second connector are connected.

Figure 2:
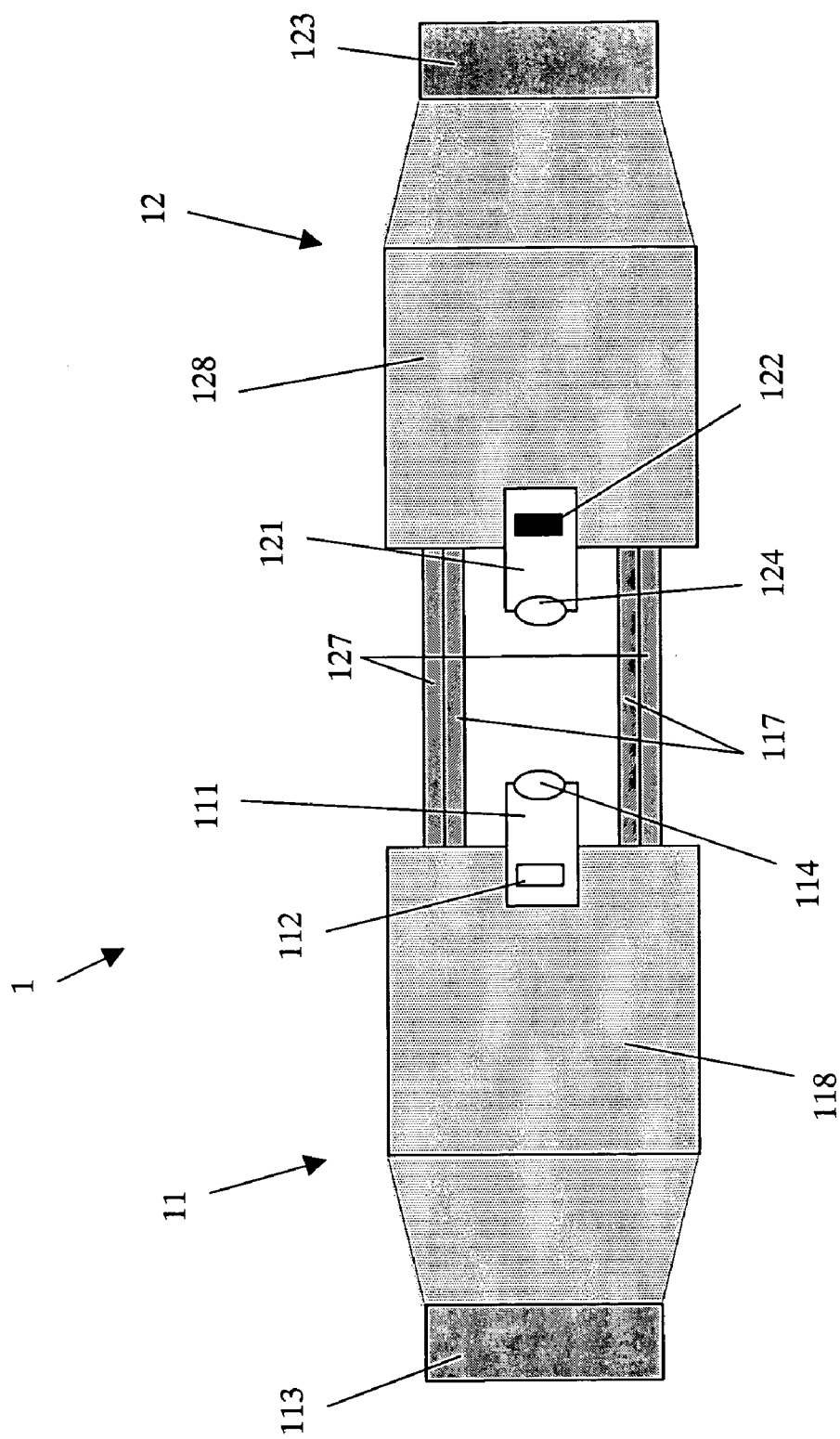
FIG. 2 is a schematic view showing the structure of the interior of a case of the optical connector according to the first embodiment.

FIG. 2 is a schematic diagram showing the structure of the interior of the case in the condition of FIG. 1B (condition in which both the connectors are connected).

The optical connector 1 of this embodiment includes a first connector 11 in which an optical transmitter module 111 is disposed inside a case 117 and a second connector 12 in which an optical receiver module 121 is disposed inside a case 127 and the first connector 11 and the second connector 12 are connectable/disconnectable as shown in FIGS. 1A and 1B. More specifically, by inserting the first connector 11 into the second connector 12 in the condition of FIG. 1A in the direction of an arrow of FIG. 1A, both the connectors are connected in the condition of FIG. 1B.

When the first connector 11 and the second connector 12 are connected as shown in FIG. 2, an optical transmitter module 111 and an optical receiver module 121 are opposed to each other across space.

Because the optical connector 1 having the structure shown in FIGS. 1A, 1B and 2 can transmit data in a single direction (from the first connector 11 to the second connector 12) by optical transmitting, for example, a device connecting portion 113 of the first connector 11 may be connected to a digital still camera, as a peripheral device (DSC) (not shown), and a device connecting portion 123 of the second connector 12 may be connected to a cradle (not shown) which is connected to a personal computer as an electronic apparatus, in order to transmit a large amount of image data from the DSC to the cradle.

(B) Optical Transmitter Module 111 and Optical Receiver Module 121:

The optical transmitter module 111 disposed at an end of the first connector 11 constituting the optical connector 1 is accommodated (implanted?) partially in a molding portion 118 and includes a light emission element 112 such as light emitting diode (LED) and a driver (not shown). A device connecting portion 113 is provided at the other end of the first connector 11 and connected to a predetermined connecting portion formed in the DSC (not shown) as a peripheral device.

The optical transmitter module 111 receives data (electric signal) outputted from the DSC side through a terminal (not shown) formed inside this device connecting portion 113 and supplies the data to a driver (not shown). The driver drives a light emitting element 112 using this data signal and the driven light emitting element 112 converts input electric signal to optical signal for optical transmitting and then emits light to an optical receiver module 121 opposing each other across space through a lens 114.

On the other hand, the optical receiver module 121 disposed at an end of the second connector 12 is accommodated partially in a molding portion 128 and includes, for example, a light receiving element 122 such as a photo diode. This light receiving element 122 receives optical signal from the light emitting element 112 of the optical transmitter module 111 through a lens 124 and converts received optical signal to electric signal. The converted electric signal is output to a terminal (not shown) of the device connecting portion 123 formed at the other end of the second connector 12 and sent to the cradle connected to the device connecting portion 123. As a consequence, data transmitted from the DSC (for example, image data) can be received by the cradle (not shown) through the optical connector 1. In the meantime, this optical receiver module 121 may be provided with a buffer (not shown) to store received data temporarily.

To execute optical transmitting effectively, an interval between the optical transmitter module 111 and the optical receiver module 121 when the first connector 11 and the second connector 12 are connected may be less than or equal to 50 mm. Such data transmitting by optical transmitting enables high-speed communication of several tens to several hundreds times a conventional case, thereby achieving, for example, a data transmitting speed of 100 Mbps or more (10 Gbps as upper limit).

(C) Case 117, 127;

The optical transmitter module 111 and the optical receiver module 121 are held and fixed in a case constituting the first connector 11 and the second connector 12 (the former is a case 117 and the latter is a case 127). These cases 117, 127 have a substantially rectangular section and are formed of conductive material, for example, metal such as aluminum, iron, stainless steel, nickel and copper and alloy thereof.

To connect the first connector 11 to the second connector 12, a front end of the case constituting the first connector 11 (the case 117) is inserted into an opening portion 127a (see FIG. 1A) at the front end of the case constituting the second connector 12 (the case 127) so as to integrate the first connector 11 with the second connector 12. Because both of the cases 117, 127 are formed of conductive material in this case, when the case 117 and the case 127 are integrated in contact with each other, it comes that the cases 117, 127 are connected electrically with each other so that electric signal or direct current can be supplied through the cases 117, 127.

In the meantime, when direct current is supplied or electric signal is supplied through the cases 117, 127, two passages need to be formed in the cases 117, 127.

Figure 3:
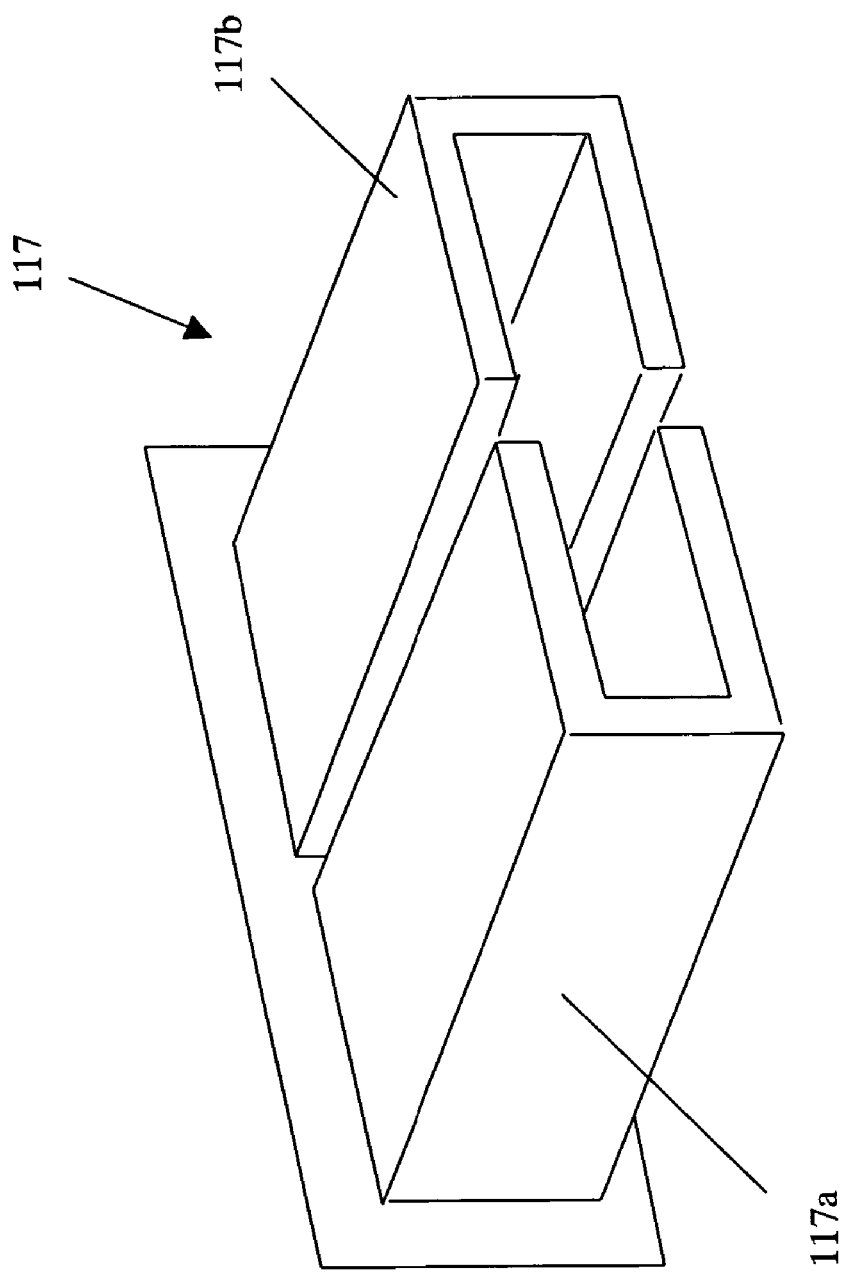
FIG. 3 is a schematic view showing an embodiment of the structure of the case.
Figure 4:
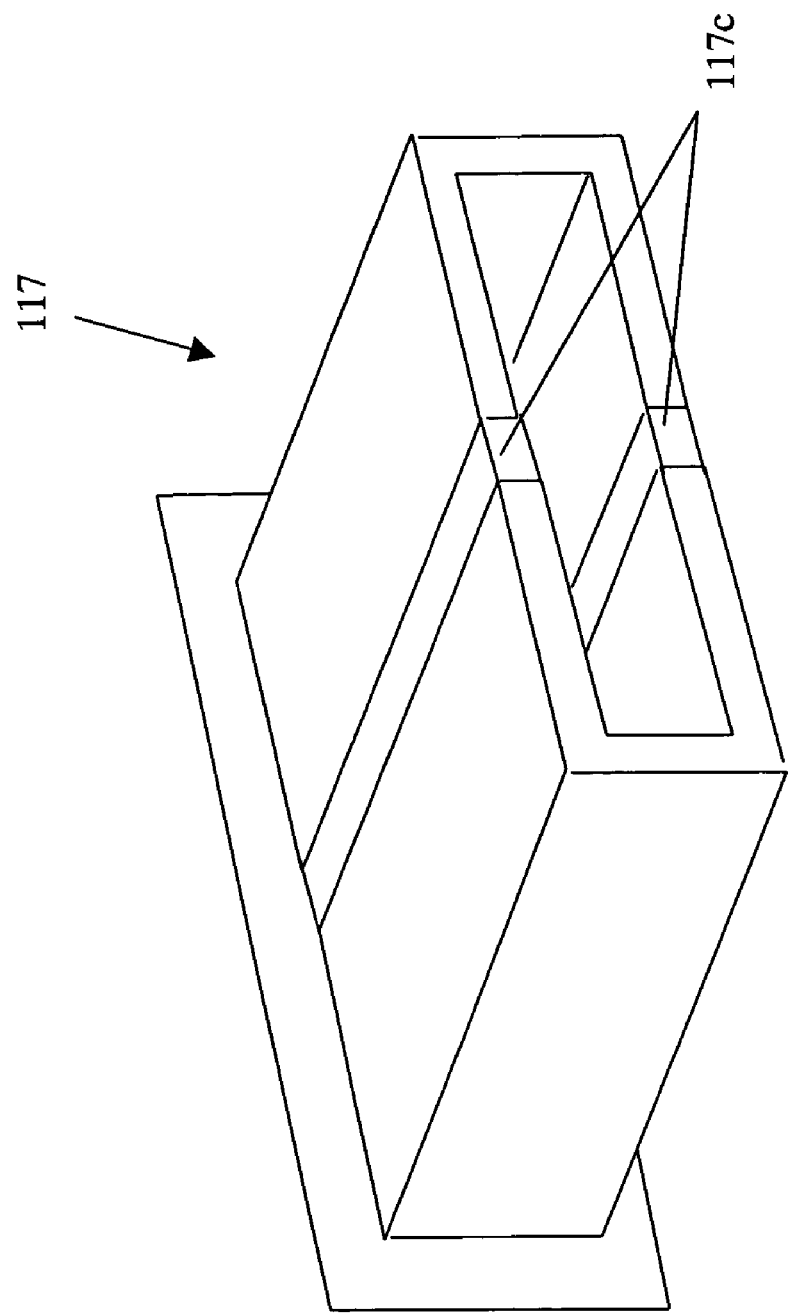
FIG. 4 is a schematic view showing another embodiment of the structure of the case.

FIGS. 3, 4 show an example in which two passages are formed in the case 117 and FIG. 3 is a schematic diagram showing a condition in which the case 117 is constructed of two members, a first case 117a and a second case 117b and FIG. 4 is a schematic diagram showing a condition in which insulating portion 117c is formed in the case 117. By forming the two passages in the case 117 in accordance therewith, power feeding, supply of electric signal and data communication are easily carried out by bringing the case 117 and the case 127 into a physical contact with each other.

Although FIGS. 3, 4 show only the case 117 constituting the first connector 11, the case 127 constituting the second connector 12 may adopt the same structure.

When the cases 117, 127 constituting the first connector 11 and the second connector 12 are constructed in double structures so as to bring their inside cases and outside cases into contact with each other, two passages can be formed. The structures of the cases 117, 127 described above may be applied to respective embodiments described as well as this embodiment.

(D) Effect of the First Embodiment

In the optical connector 1 of the first embodiment, the optical transmitter module 111 and the optical receiver module 121 are disposed in the cases 117, 127 such that they are opposed to each other so as to transmit information by spatial optical transmitting. Therefore, no connection failure due to damage of wiring occurs or the durability to connection/disconnecting is secured semi-permanently and by adopting optical transmitting as a transmitting means of data information, acceleration of transmitting and higher capacity transmitting can be achieved.

Because such optical transmitting is carried out inside the case, cross talk can be suppressed and eye safety can be achieved, thereby providing a reliable and high safety optical connector.

(II) Second Embodiment

The optical connector 2 according to the second embodiment of the present invention will be described with reference to FIG. 5. The optical connector 1 of the first embodiment includes the optical transmitter module 111 in the first connector 11 and the optical receiver module 121 in the second connector 12 so as to execute spatial optical transmitting in a single direction.

Contrary to this, the optical connector 2 of the embodiment includes two optical transmitter modules 111a, 111b in the first connector 11 and two optical receiver modules 121a, 121b corresponding to the optical transmitter modules 111a, 111b in the second connector 12 so as to execute plural spatial optical transmitting in a single direction (single direction multiple optical transmitting).

Figure 5:
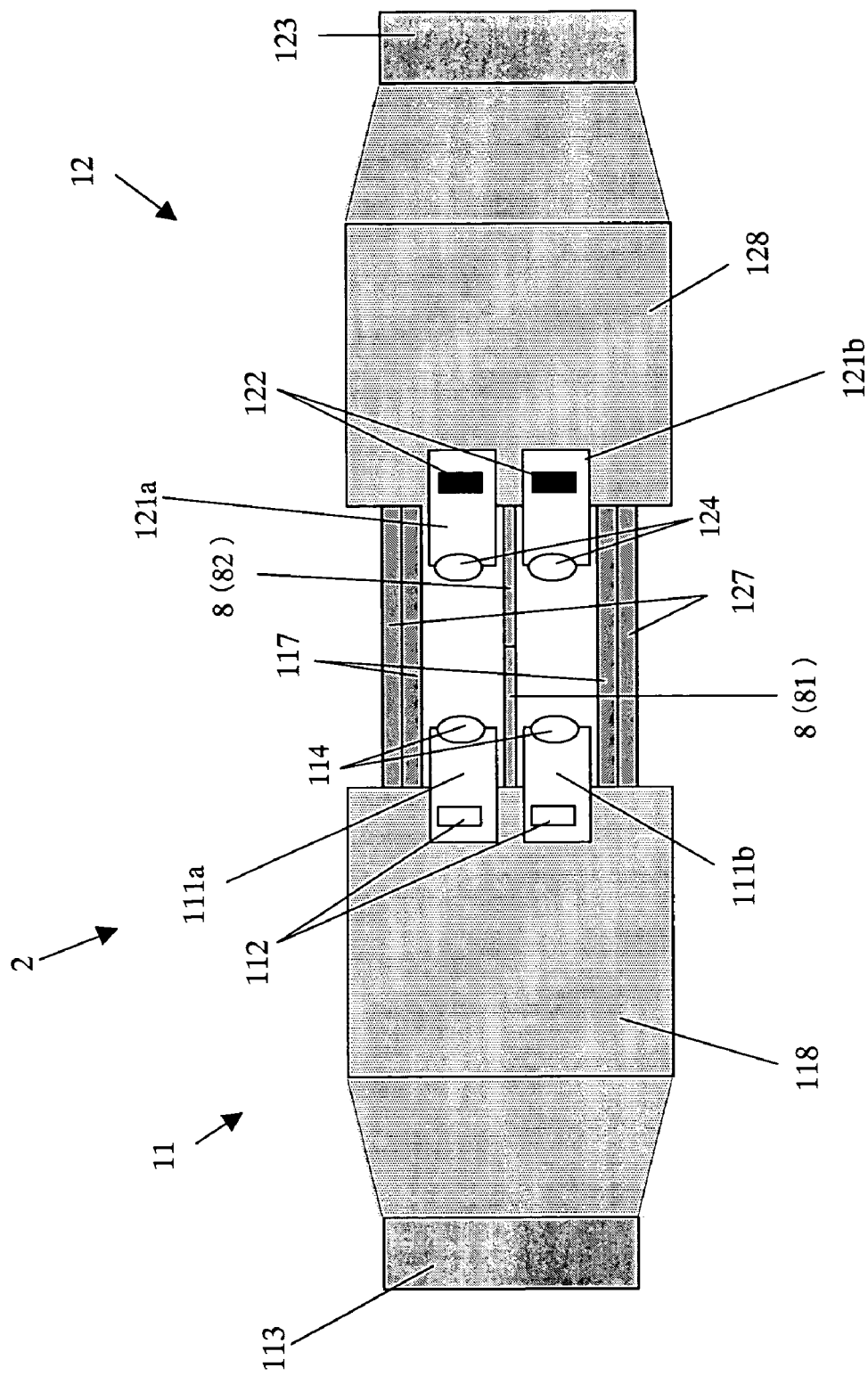
FIG. 5 is a schematic diagram showing the structure of interior of the case of the optical connector according to a second embodiment of the present invention.

FIG. 5 is a schematic view showing the structure of interior of the case of the optical connector 2 according to the second embodiment. The optical connector 2 of this embodiment includes the two optical transmitter modules 111a, 111b disposed in the first connector 11 and the two optical receiver modules 121a, 121b disposed in the second connector 12 such that they are opposed to each other across space.

In the first connector 11, the optical transmitter module 111a and the optical transmitter module 111b are disposed in parallel and in the second connector 12, the optical receiver module 121a and the optical receiver module 121b are disposed in parallel. A light shielding body 8 is disposed so as to shield the optical transmitter module 111a in the first connector 11 and the light receiver module 121a in the second connector 12 from the optical transmitter module 111b in the first connector 11 and the optical receiver module 121b in the second connector 12. The arrangement of this light shielding body 8 separates passages of optical signals sent from the two optical transmitter modules 111a, 111b in the first connector 11, so that the two optical signals do not interfere thereby the optical transmitting being executed effectively.

Referring to FIG. 5, the light shielding body 8 includes a first light shielding body 81 disposed in the first connector 11 and a second light shielding body 82 disposed in the second connector 12 and when the both connectors 11, 12 are connected, the front end of the first light shielding body 81 and the front end of the second light shielding body 82 abut each other.

Because the first connector 11 and the second connector 12 are electrically connected with the light shielding body 8 if the light shielding body 8 is formed of conductive material, two passages are formed with the light shielding body 8 and the cases 117, 127. Even unless the two passages are formed especially by adopting the structure shown in FIG. 3, thereby it is possible to execute power feeding and transmitting of electric signal between the both connectors (data communication).

If the wavelength of optical signals emitted from the two optical transmitter modules 111a, 111b of the first connector 11 are set different and the optical receiver modules 121a, 121b of the second connector 12 are equipped with a wavelength selecting filter respectively which allows only the wavelength of optical signal emitted from corresponding optical transmitter module to pass through or the light receiving element of the optical receiver module is equipped with distributed bragg reflector (DBR), optical signals do not interfere with each other even if the light shielding body 8 shown in FIG. 5 is not formed. If the wavelength of the optical signals emitted form the two optical transmitter modules 111a, 111b are set different likewise, the light receiving elements 122 disposed at the optical receiver modules 121a, 121b may be formed of materials having different band gap so as to receive by selecting only the wavelength of the optical signal emitted from a corresponding optical transmitter module. As a consequence, the wavelength multiplex optical transmitting can be carried out effectively without disposing the light shielding body 8 described previously. The same thing can be said in case of wavelength multiplexing in the same direction and wavelength multiplexing in bi-directions in the following embodiments.

The optical connector 2 of the second embodiment can execute plural optical transmitting in a single direction so as to accelerate transmitting of information by adopting the structure of disposing the optical transmitter modules 111a, 111b in the first connector 11 and the optical receiver modules 121a, 121b in the second connector 12.

(III) Third Embodiment

The optical connector 3 according to the third embodiment of the present invention will be described with reference to FIG. 6. The optical connector 3 of this embodiment includes an optical transmitter module 111c and an optical receiver module 121d in the first connector 11 and an optical transmitter module 111d and an optical receiver module 121c in the second connector 12 so as to transmit optical signals in spatial bi-directions.

Like reference numerals are attached to the same or substantially the same components as described previously in a following description and explanation of those components is not described.

Figure 6:
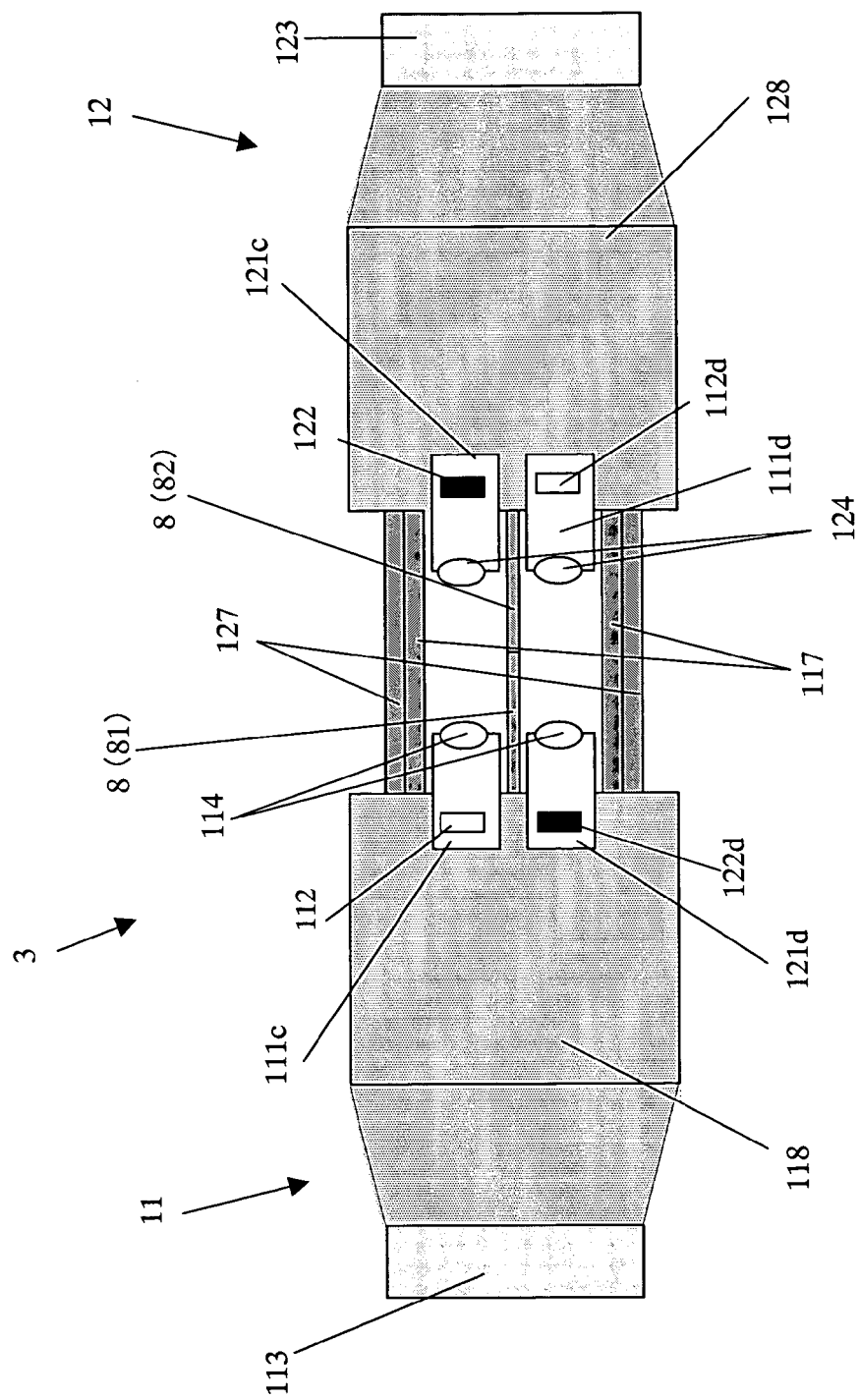
FIG. 6 is a schematic diagram showing the structure of interior of the case of the optical connector according to the third embodiment of the present invention.

FIG. 6 is a schematic view showing the structure of interior of the case of the optical connector 3 of the third embodiment. In the optical connector 3 of this embodiment, the optical transmitter module 111c disposed in the first connector 11 and the optical receiver module 121c disposed in the second connector 12 are opposed to each other across space inside the connector and the optical transmitter module 111d disposed in the second connector 12 are opposed to the optical receiver module 121d disposed in the first connector 11 across space.

The optical connector 3 having such a structure includes two pairs of the optical transmitter modules and the optical receiver modules (optical transmitter module 111c/optical receiver module 121c, and optical transmitter module 111d/optical receiver module 121d). As a consequence, bi-directional optical transmitting is enabled and if the device connecting portion 113 of the first connector 11 is connected to an USB memory (not shown) which is a peripheral device and the device connecting portion 123 of the second connector 12 is connected to a personal computer (not shown), low-speed and high-speed data communication can be executed between the USB memory and the personal computer in bi-directions.

More specifically, the optical connector 3 having the structure shown in FIG. 6 executes spatial optical transmitting in a single direction from the optical transmitter module 111c to the optical receiver module 121c between the optical transmitter module 111c disposed in the first connector 11 and the optical receiver module 121c disposed in the second connector 12. In the optical transmitter module 111d provided in the second connector 12, electric signal (data signal) output from a personal computer (not shown) is received by a terminal formed inside the device connecting portion 123 of the second connector 12 and supplied to a driver (not shown). The driver drives the light emitting element 112d using this input electric signal and the driven light emitting element 112d converts the data signal to optical signal for optical transmitting and emits the light to the optical receiver module 121d opposing across space through the lens 124. The light receiving element 122d of the optical receiver module 121d receives optical signal from the light emitting element 112d of the optical transmitter module 111d through a lens 114 and converts the received optical signal to electric signal. This electric signal is output to a terminal (not shown) of the device connecting portion 113 formed at the other end of the first connector 11 and transmitted to a personal computer (not shown) connected to the device connecting portion 113 so that bi-directional spatial optical transmitting can be executed between the USB memory and the personal computer.

According to this embodiment, the optical transmitter modules 111c, 111d and the optical receiver modules 121c, 121d are disposed laterally in parallel in the respective connectors 11, 12. The light shielding bodies 8 are disposed so as to shield the optical transmitter module 111c of the first connector 11 and the optical receiver module 121c of the second connector 12 from the optical transmitter module 111d of the second connector 12 and the optical receiver module 121d of the first connector 11. As a consequence, a passage of an optical signal emitted from the optical transmitter module 111c of the first connector 11 and the a passage of an optical signal emitted from the optical transmitter module 111d of the second connector 12 are separated from each other so that even if the wavelengths of the two optical signals are equal, these optical signals do not interfere.

Because the optical connector 3 of the third embodiment adopts a structure in which the optical transmitter modules 111c, 111d and the optical receiver modules 121c, 121d are disposed in the first connector 11 and the second connector 12, bi-directional optical transmitting can be executed so as to diversify the information transmitting.

(IV) Fourth Embodiment

The optical connector 4 according to the fourth embodiment of the present invention will be described with reference to FIG. 7.

The optical connector described in the third embodiment includes the optical transmitter module 111c and the optical receiver module 121d in the first connector 11 and the optical transmitter module 111d and the optical receiver module 121c in the second connector 12 so as to execute bi-directional spatial optical transmitting.

The optical connector 4 of this embodiment is different from the optical connector 3 of the third embodiment in that an optical transmitter module 115 which supplies electricity for power feeding is additionally disposed inside the first connector 11 and an optical receiver module 125 which is supplied with electricity for power feeding in the form of light corresponding to the optical transmitter module 115 is disposed inside the second connector 12.

In a following description, description of the same or substantially the same components as described previously is not repeated with same reference numerals attached thereto.

Figure 7:
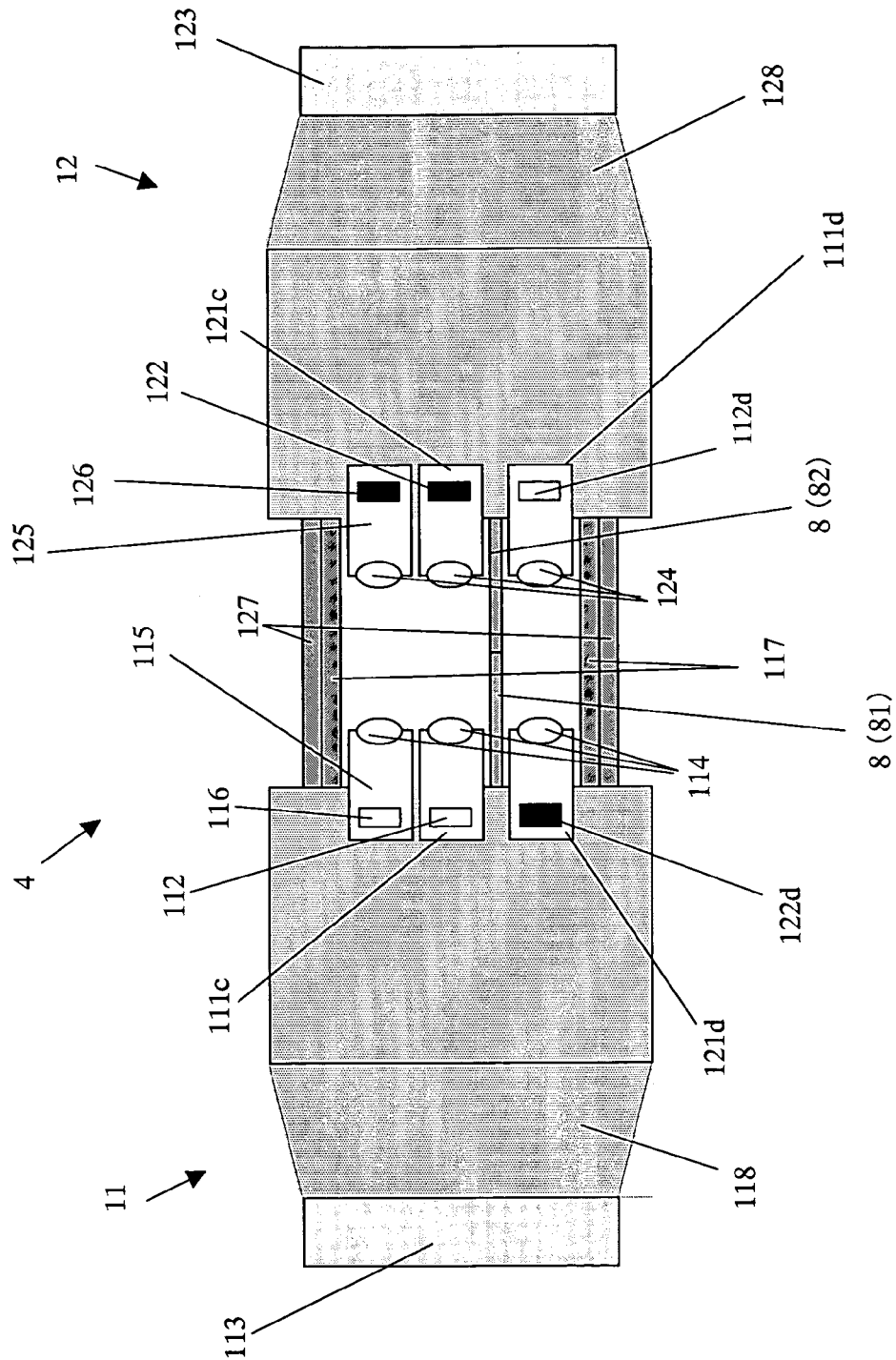
FIG. 7 is a schematic diagram showing the structure of interior of the case of the optical connector according to the fourth embodiment of the present invention.

FIG. 7 is a schematic view showing the structure of interior of the case of the optical connector 4 according to the fourth embodiment. The optical connector 4 of this embodiment includes the optical transmitter module 115 and the optical receiver module 125 for power feeding as well as the optical transmitter modules 111c, 111d and the optical receiver modules 121c, 121d for the bi-directional optical transmitting.

The optical transmitter modules 111c, 111d for data communication and the optical transmitter module 115 for power feeding disposed in the optical connector 4 can select their functions by differentiating the wavelength ranges of optical signals to be transmitted and for example, can select appropriate functions if the wavelength range of the former is set in a range of 0.3 µm to 0.7 µm and the wavelength range of the latter is set in a range of 0.8 µm-1.0 µm.

If the optical transmitter module 115 and the optical receiver module 125 for power feeding are disposed inside the connector as described in this embodiment, electric signal for power feeding sent from a personal computer connected to the first connector 11 is converted to optical signal for optical transmitting by the optical transmitter module 115 for power feeding of the first connector 11 and light is emitted from the light emitting element 116 for power feeding to the optical receiver module 125 for power feeding disposed opposing the light emitting element 116 for power feeding across space through the lens 114. This optical signal is received by the light receiving element 126 of the optical receiver module 125 through the lens 124 and the received optical signal is converted to electric signal and after that, sent to the USB connector connected to the second connector 12.

Because the bi-directional optical transmitting by the optical transmitter module 111c and the optical receiver module 121c and the optical transmitter module 111d and the optical receiver module 121d is the same as that of the third embodiment described previously, explanation thereof is described.

The optical connector 4 of the fourth embodiment can execute the bi-directional optical transmitting like the third embodiment so as to diversify the information transmitting. Additionally, electricity can be transmitted by optical transmitting as well as information by disposing the optical transmitter module 115 and the optical receiver module 125 for power feeding.

(V) Fifth Embodiment

The optical connector 5 according to the fifth embodiment of the present invention will be described with reference to FIG. 8. The third embodiment indicates an example that the optical transmitter modules 111c, 111d and the optical receiver modules 121c, 121d are used as a medium for the bi-directional optical transmitting. The optical connector 5 of this embodiment executes bi-directional spatial optical transmitting by disposing optical transmitter/receiver modules 119, 129 in the first connector 11 and the second connector 12.

In a following description, explanation of the same or substantially the same components as described previously is not described with same reference numerals attached thereto.

Figure 8:
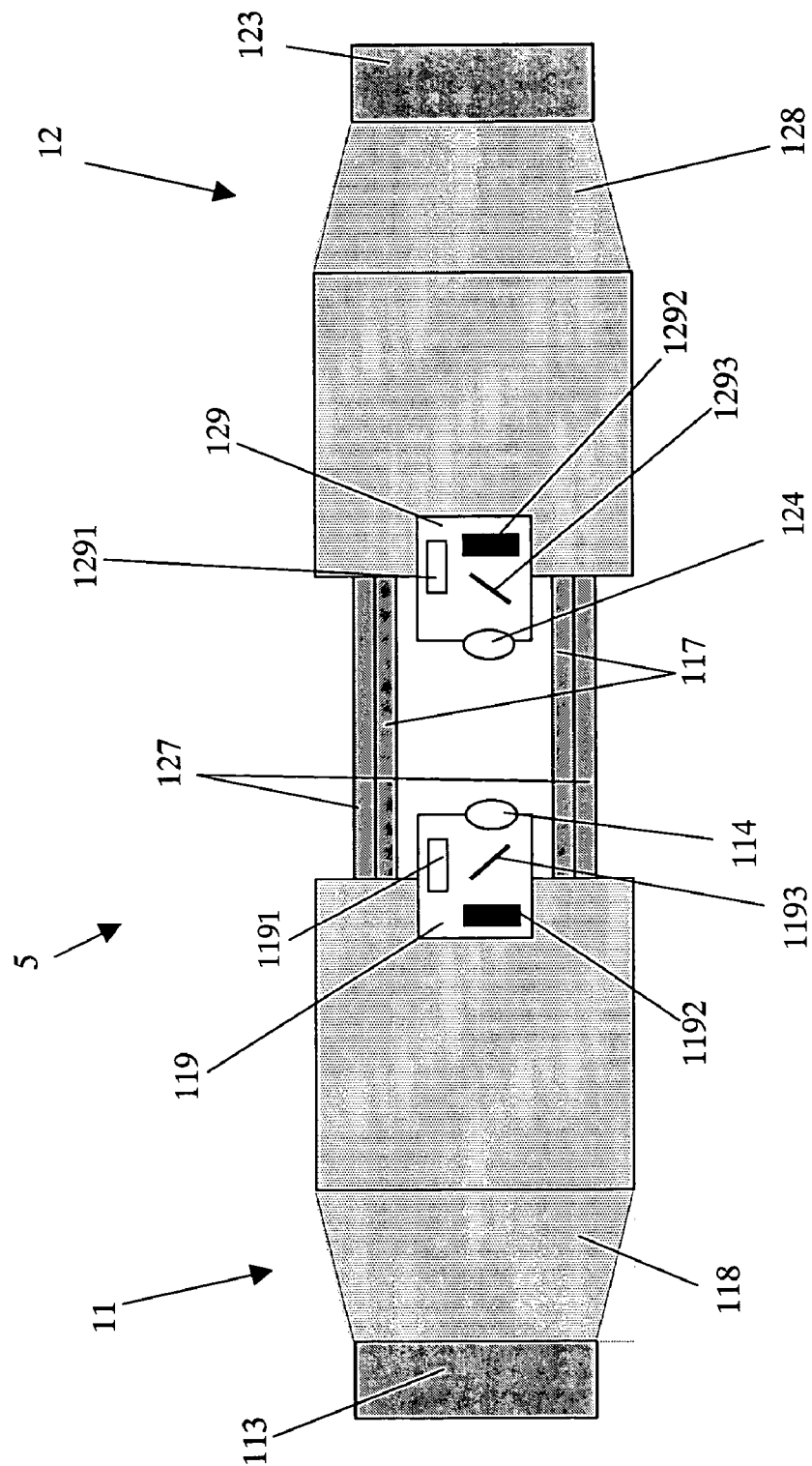
FIG. 8 is a schematic diagram showing the structure of interior of the case of the optical connector according to the fifth embodiment of the present invention.

FIG. 8 is a schematic view showing the structure of interior of the case of the optical connector 5 of the fifth embodiment.

The optical transmitter/receiver module 119 disposed in the first connector 11 shown in FIG. 8 includes a light emitting element 1191 as a light transmitting portion which converts input electric signal to optical signal and sends it to the second connector 12 and a light receiving element 1192 as a light receiving portion which receives optical signal from the second connector 12 having a different wavelength from this light emitting element 1191, converts to electric signal and outputs and additionally, a wavelength selecting filter 1193. This wavelength selecting filter 1193 has a function of directing an optical signal from the light emitting element 1291 described later of the second connector 12 to the light receiving element 1192 and then directing an optical signal from the light emitting element 1191 to a light receiving element 1292 (described later) of the second connector 12.

Likewise, the optical transmitter/receiver module 129 disposed in the second connector 12 includes a light receiving element 1292 as a light receiving portion which converts optical signal from the light emitting element 1191 of the first connector 11 and outputs and a light emitting element 1291 as a light transmitting portion which converts input electric signal to optical signal and transmits to the light receiving element 1192 of the first connector 11 and additionally a wavelength selecting filter 1293. This wavelength selecting filter 1293 has a function of directing an optical signal from the light emitting element 1191 of the first connector 11 to the light receiving element 1292 of the second connector and further directing an optical signal from the light emitting element 1291 of the second connector 12 to the light receiving element 1192 of the first connector 11.

The wavelength selecting filters 1193, 1293 disposed in the optical transmitter/receiver modules 119, 129 and capable of passing a certain wavelength light selectively and reflecting a certain wavelength light selectively enables the light receiving element to receive an optical signal having a specified wavelength when a light emitting element and a light receiving element are provided in a single module and the light emitting element to transmit an optical signal having a wavelength different from the optical signal received by the light receiving element, so that a following function is exerted. According to this embodiment, the wavelength selecting filter 1193 in the first connector 11 allows an optical signal (wavelength is assumed to be $\lambda_1$) from the light emitting element 1291 of the second connector 12 to pass, directs it to the light receiving element 1192, and reflects an optical signal (wavelength is assumed to be $\lambda_2$) from the light emitting element 1191 toward the light receiving element 1292 of the second connector. The wavelength selecting filter 1293 in the second connector 12 allows an optical signal from the light emitting element 1191 of the first connector 11 having the wavelength $\lambda_2$ to pass and directs it to the light receiving element 1292 and at the same time, reflects an optical signal from the light emitting element 1291 of the second connector 12 having the wavelength $\lambda_1$ and directs to the light receiving element 1192 of the first connector 11. As a consequence, the light transmitter/receiver modules 119, 129 have functions of executing optical transmitting and optical receiving with this single module.

In the optical connector 5 of this embodiment, an optical signal emitted from the light emitting element 1191 of the optical transmitter/receiver module 119 disposed in the first connector 11 can be received by the light receiving element 1292 of the optical transmitter/receiver module 129 disposed in the second connector 12 and an optical signal emitted from the light emitting element 1291 of the optical transmitter/receiver module 129 can be received by the light receiving element 1192 of the optical transmitter/receiver module 119 disposed in the first connector 11 so as to execute simultaneous bi-directional optical transmitting. As a consequence, diversification of information transmitting can be achieved and transmitting and receiving of optical signal can be executed with a pair of the optical transmitter/receiver modules 119, 129. Thus, reduction of the quantity of necessary components and reduction of necessary space can be achieved if comparing with the optical connector of the third embodiment which is executed by the optical transmitter module and the optical receiver module and as a consequence, reduction in the size of the optical connector can be achieved preferably.

The above-described aspects indicate aspects of the present invention and the present invention is not restricted to the above-described embodiment. Needless to say, modification and improvement within a range which the object and effect of the present invention can be achieved as well as the structure of the invention are included in the content of the present invention. Further, the structure, shape and the like for executing the present invention may be changed to other structure, shape and the like within a range which the object and effect of the invention can be achieved.

Although the above-described embodiments pick up an example of transmitting an optical signal of a kind with an optical transmitter module (or optical transmitter/receiver module), the optical connector of the present invention may adopt optical transmitter module for transmitting plural optical signals with a single optical transmitter module.

Figure 9:
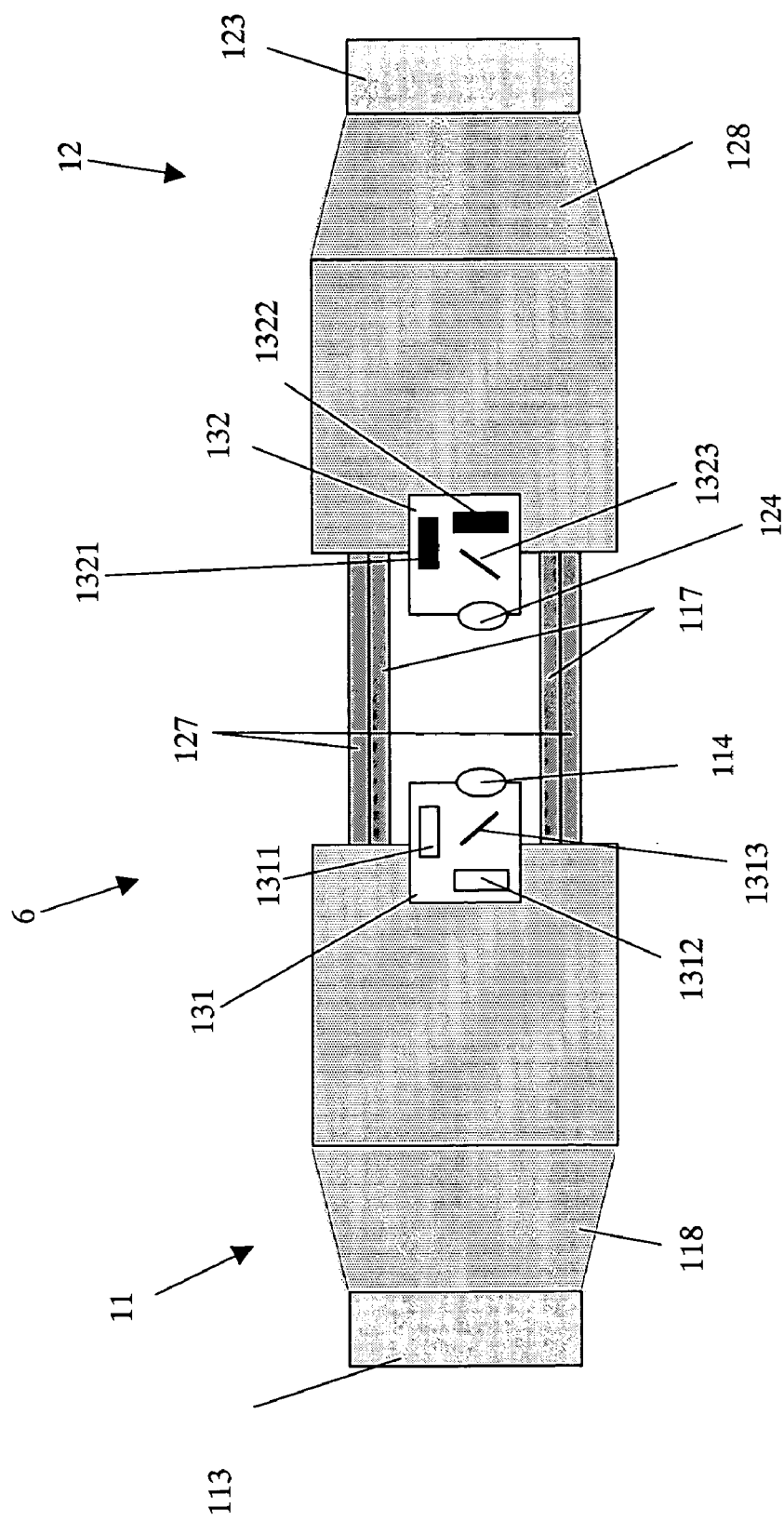
FIG. 9 is a schematic diagram showing the structure of interior of the case according to another embodiment of the optical connector of the present invention.

FIG. 9 is a diagram showing other aspect of the optical connector of the present invention or a schematic diagram showing the structure of interior of the case of an optical connector 6 which adopts optical transmitter module 131 capable of transmitting two optical signals.

The optical transmitter module 131 disposed in the first connector 11 of the optical connector 6 includes two light emitting elements 1311, 1312 and further a wavelength selecting filter 1313. In the meantime, an optical receiver module 132 disposed in the second connector 12 includes two corresponding light receiving elements 1321, 1322 and further a wavelength selecting filter 1323.

The wavelength selecting filter 1313 disposed in the optical transmitter module 131 reflects optical signal having a wavelength (for example, $\lambda_1$) sent from the light emitting element 1311 and allows optical signal sent having a wavelength (for example, $\lambda_2$) from the light emitting element 1312 to pass through selectively. As a consequence, two kinds of the optical signals are transmitted to the optical receiver module 132 of the second connector 12 at the same time through the lens 114.

On the other hand, in the optical receiver module 132 of the second connector 12, optical signal having wavelength $\lambda_1$ sent through the lens 124 is selectively reflected by the wavelength selecting filter 1323 and received by the light receiving element 1321 and optical signal having the wavelength $\lambda_2$ is allowed to pass through selectively by the wavelength selecting filter 1323 and received by the light receiving element 1322. Two kinds of optical signals can be transmitted in a single direction at the same time so as to achieve higher speed transmitting and high capacity transmitting of information.

(VI) Sixth Embodiment

An optical connector 7 of the sixth embodiment of the present invention will be described with reference to FIG. 10.

The optical connector 7 of this embodiment includes an optical transmitter module 111*c* and an optical receiver module 121*d* in the first connector 11 and an optical transmitter module 111*d* and an optical receiver module 121*c* in the second connector 12 and interference of each other is blocked by surrounding an optical communication section with the case so as to achieve bi-directional multiplexed spatial optical transmitting.

Figure 10:
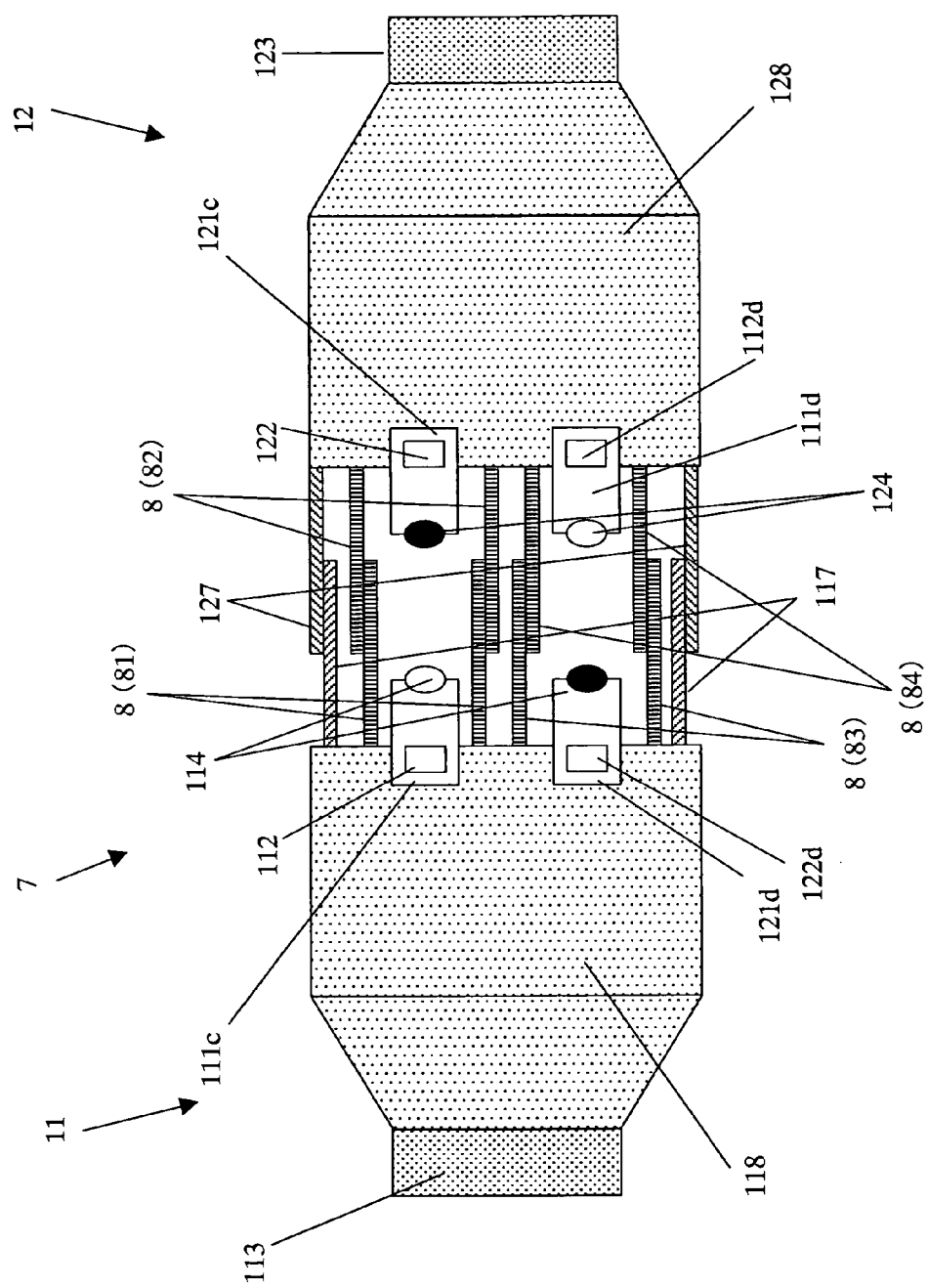
FIG. 10 is a schematic diagram showing the structure of interior of the case of the optical connector according to the sixth embodiment of the present invention.

FIG. 10 is a schematic view showing the structure of interior of the case of the optical connector 7 of the sixth embodiment. In the optical connector 7 of this embodiment, the optical transmitter module 111*c* disposed in the first connector 11 and the optical receiver module 121*c* disposed in the second connector 12 are opposed to each other across space inside the connector and the optical transmitter module 111*d* disposed in the second connector 12 and the optical receiver module 121*d* disposed in the first connector 11 are opposed to each other across space inside connector. Light shielding bodies 81 to 84 are used to separate optical signals.

Because the optical connector 7 having such a structure includes two pairs of the optical transmitter modules and optical receiver modules (optical transmitter module 111*c*/optical receiver module 121*c*, and optical transmitter module 111*d*/optical receiver module 121*d*), the bi-directional optical transmitting is enabled, so that low-speed or high-speed data communication can be executed between the USB memory and personal computer bi-directionally by connecting the device connecting portion 113 of the first connector 11 to the USB memory (USB memory) as a peripheral device and the personal computer (not shown) to the device connecting portion 123 of the second connector 12.

This embodiment allows corresponding optical transmitter module and optical receiver module to be connected to each other properly by combining the size or shape of the first light shielding body 81 and the second light shielding body 82 with the size or shape of the third light shielding body 83 and the fourth light shielding body 84 because the optical transmitter modules or the optical receiver modules cannot be fitted to each other properly. FIG. 10 adopts such a structure in which the sizes of the first light shielding body 81 and the second light shielding body 82 are different from the sizes of the third light shielding body 83 and the fourth light shielding body 84.

The function of power feeding can be added by using the connection between the first light shielding body 81 and the second light shielding body 82 and the connection between the third light shielding body 83 and the fourth light shielding body 84. Constructing each light shielding body of conductive material enables electricity to be supplied with a pair of the light shielding bodies. In this case, combining the case 117 and the case 127 with different sizes or shapes prevents electrodes of the same kind of potential from making contact with each other. In the example shown in FIG. 10, the case 127 is constructed in a slightly larger structure than the case 117 so that the case 117 can invade into the inside of the case 127. The second to fourth embodiments can apply the same structure.

Because the optical connector of the sixth embodiment is so constructed that the optical transmitter modules 111*c*, 111*d* and the optical receiver modules 121*c*, 121*d* are disposed in the first connector 11 and the second connector 12, bi-directional optical transmitting can be executed, thereby it is possible to achieve diversification of information transmitting.

The specific structure, shape and the like of the embodiment of the present invention may be changed to other structure, shape and the like within a range which enables the object of the present invention to be achieved.

INDUSTRIAL APPLICABILITY

The present invention can be used advantageously as an optical connector which connects an electronic apparatus such as a personal computer to peripherals such as a mouse, printer, keyboard, digital still camera, digital video camera and so on in order to exchange information between such devices.

What is claimed is:

1. An optical connector for connecting electronic apparatuses or an electronic apparatus with a peripheral device and having a first connector and second connector for transmitting information between such apparatuses or devices,
    wherein the first connector includes at least an optical transmitter module that converts electric signal input to interior of a case to optical signal and transmits to the second connector;
    the second connector includes at least an optical receiver module that is opposed to the optical transmitter module of the first connector inside the case, converts optical signal from the optical transmitter module of the first connector to electric signal and outputs; and
    the first connector and the second connector are connectable/disconnectable,
    further comprising an optical transmitter module for power feeding that supplies electricity to interior of the case of the first connector through light and an optical receiver module for power feeding that is supplied with electricity to interior of the case of the second connector.

2. The optical connector according to claim 1, wherein the first connector includes plural optical transmitter modules and the second connector includes plural optical receiver modules corresponding to the optical transmitter modules.

3. The optical connector according to claim 2, wherein light shielding bodies are disposed inside the first connector and the second connector so that passages of optical signals transmitted by the optical transmitter modules of the first connector are separated by the light shielding bodies.

4. The optical connector according to claim 2, wherein the wavelengths of optical signals transmitted by the optical transmitter modules of the first connector are different from each other and the optical receiver module corresponding to the optical transmitter module includes a wavelength selecting filter that allows only the wavelength of optical signal transmitted by the corresponding optical transmitter module to pass through.

5. The optical connector according to claim 2, wherein the wavelengths of optical signals transmitted by the optical transmitter modules of the first connector are different from each other and the light receiving element disposed in the optical receiver module corresponding to the optical transmitter module receives only the wavelength of optical signal transmitted from the corresponding optical transmitter module selectively.

6. An optical connector for connecting electronic apparatuses or an electronic apparatus with a peripheral device and having a first connector and second connector for transmitting information between such apparatuses or devices,
    wherein the first connector includes at least an optical transmitter module that converts electric signal input to interior of a case to optical signal and sends to the second connector and at least an optical receiver module that receives optical signal from the second connector, converts to electric signal and outputs;
    the second connector includes at least an optical receiver module that is opposed to the optical transmitter module of the first connector inside the case, converts optical signal from the optical transmitter module of the first connector to electric signal and outputs and an optical transmitter module that is opposed to the optical receiver module of the first connector, converts the input electric signal to optical signal and sends to the optical receiver module of the first connector; and
    the first connector and the second connector are connectable/disconnectable,
    further comprising an optical transmitter module for power feeding that supplies electricity to interior of the case of the first connector through light and an optical receiver module for power feeding that is supplied with electricity to interior of the case of the second connector.

7. The optical connector according to claim 6, wherein light shielding bodies are disposed inside the first connector and the second connector so that passages of optical signals transmitted by the optical transmitter modules of the first connector or the second connector are separated by the light shielding bodies.

8. The optical connector according to claim 6, wherein the wavelengths of optical signals transmitted by the optical transmitter modules of the first connector and the second connector are different from each other and the optical receiver module corresponding to the optical transmitter module includes a wavelength selecting filter that allows only the wavelength of optical signal transmitted by the corresponding optical transmitter module to pass through.

9. The optical connector according to claim 6, wherein the wavelengths of optical signals transmitted by the optical transmitter modules of the first connector and the second connector are different from each other and the light receiving element disposed in the optical receiver module corresponding to the optical transmitter module receives only the wavelength of optical signal transmitted from the corresponding optical transmitter module selectively.

10. An optical connector for connecting electronic apparatuses or an electronic apparatus with a peripheral device and having a first connector and second connector for transmitting information between the apparatuses or devices, wherein the first connector includes an optical transmitter/receiver module comprising at least a light transmitting portion that converts electric signal input to interior of a case to optical signal and sends to the second connector, at least a light receiving portion that receives optical signal having a wavelength different from the optical signal of the light transmitting portion from the second connector, converts to electric signal and outputs, and a wavelength selecting filter that directs optical signal from the second connector to the light receiving portion and directs optical signal from the light transmitting portion to the second connector;
    the second connector includes an optical transmitter/receiver module comprising at least a light receiving portion that is opposed to the optical transmitter/receiver module of the first connector inside the case for converting optical signal from the light transmitting portion of the first connector to electric signal and outputting, a light transmitting portion that converts the input electric signal to optical signal and sends to the light receiving portion of the first connector, and a wavelength selecting filter that directs optical signal from the light transmitting portion of the first connector to the light receiving portion of the second connector and directs optical signal from the light transmitting portion of the second connector to the light receiving portion of the first connector; and the first connector and the second connector are connectable/disconnectable, further comprising an optical transmitter module for power feeding that supplies electricity to interior of the case of the first connector through light and an optical receiver module for power feeding that is supplied with electricity to interior of the case of the second connector.

11. The optical connector according to any one of claims 1, 2, 6 and 10, wherein the cases are formed of conductive material and the cases are connected electrically through contact between the first connector and the second connector thereby enabling supply of electric signal or direct current through the cases.

* * * * *